United States Patent [19]
Grieshop

[11] Patent Number: 6,095,616
[45] Date of Patent: Aug. 1, 2000

[54] GRAVITY DISCHARGE GRAIN WAGON WITH DISCHARGE OPENING CLOSURE SYSTEM

[75] Inventor: Scott M. Grieshop, Ft. Recovery, Ohio

[73] Assignee: J. & M. Manufacturing Co., Inc., Ft. Recovery, Ohio

[21] Appl. No.: 09/251,134

[22] Filed: Feb. 16, 1999

[51] Int. Cl.$^7$ .................................. B60P 1/04; B60P 1/56; B61D 7/00
[52] U.S. Cl. ................................ 298/27; 298/28; 414/519
[58] Field of Search .................................. 298/24, 27, 28; 414/519; 105/247, 250, 256, 280, 282.3

[56] References Cited

U.S. PATENT DOCUMENTS

| | | | |
|---|---|---|---|
| 2,827,204 | 3/1958 | McCurdy | 298/24 |
| 3,391,812 | 7/1968 | Heider | 414/519 X |
| 3,521,930 | 7/1970 | Tucker | 298/24 |
| 4,646,942 | 3/1987 | Kahns | 298/24 X |
| 5,615,990 | 4/1997 | Grieshop | 414/526 |

OTHER PUBLICATIONS

J. & M. Manufacturing Co., Inc. Large Capacity Grain Wagons, Brochure, 4 Pages, USA Jun. 1995.

Primary Examiner—D. Glenn Dayoan
Assistant Examiner—Scott A. Carpenter
Attorney, Agent, or Firm—Jacox, Meckstroth & Jenkins

[57] ABSTRACT

A wheel supported grain wagon includes a box or container with sloping side walls extending to a bottom wall, and a discharge opening is formed within one of the side walls adjacent the bottom wall. An inner metering door or panel and an adjacent outer closure door or panel are supported by parallel spaced dual tracks for movement between lower positions closing the discharge opening and retracted upper open positions. An actuator first raises the outer closure panel to permit grain to flow through a metering passage defined by the bottom edge of the metering panel and to release grain pressure on the metering panel. The metering door is then elevated in response to further elevation of the outer closure panel so that grain flows smoothly under both panels without obstructions.

9 Claims, 3 Drawing Sheets

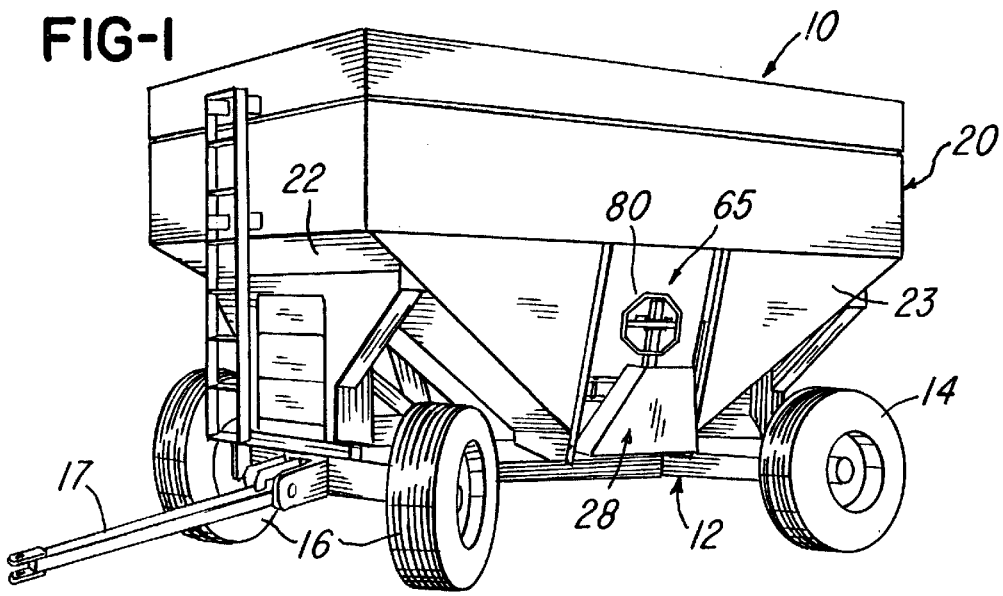
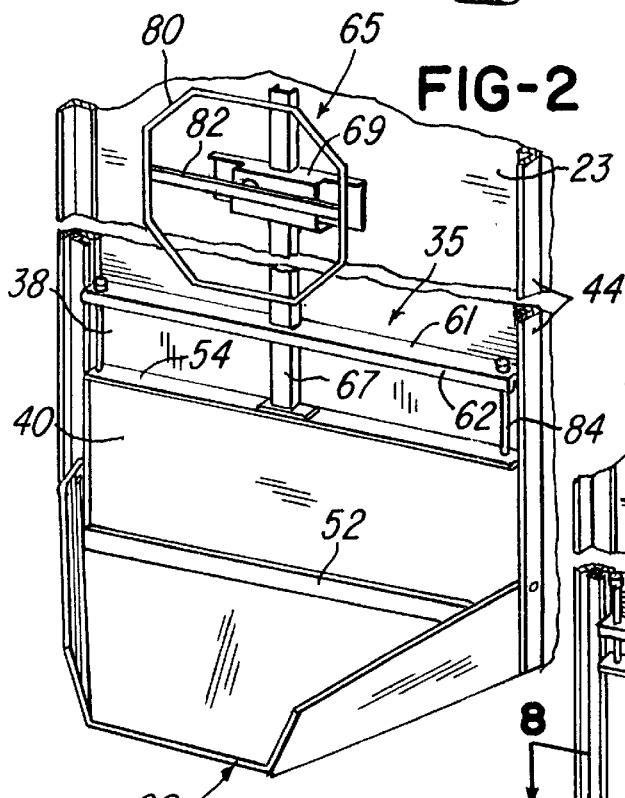
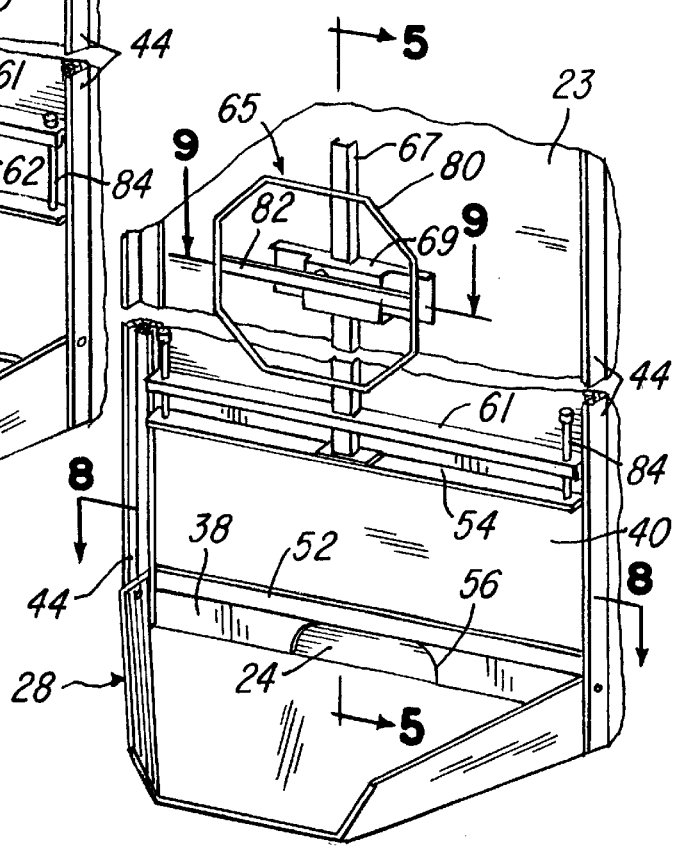

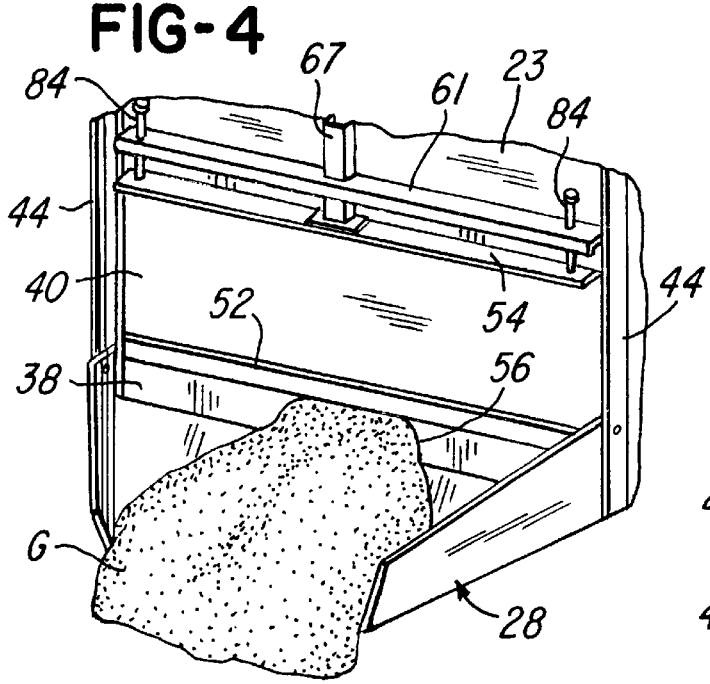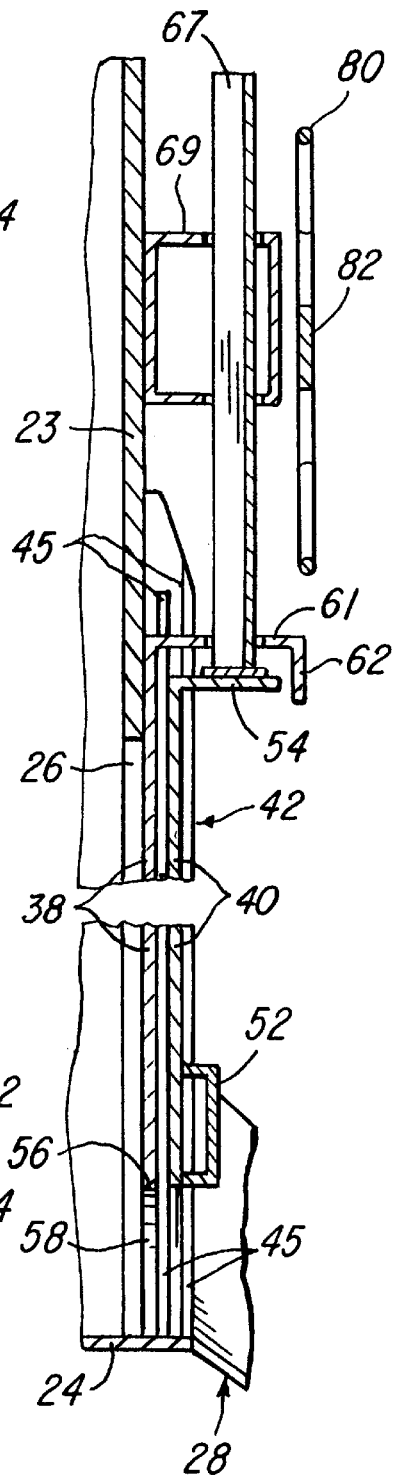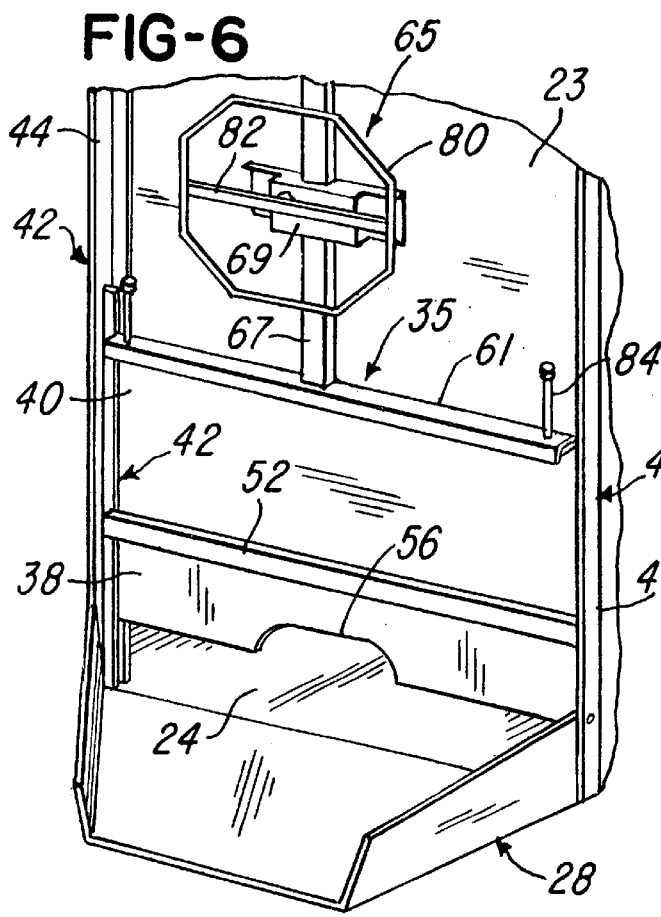

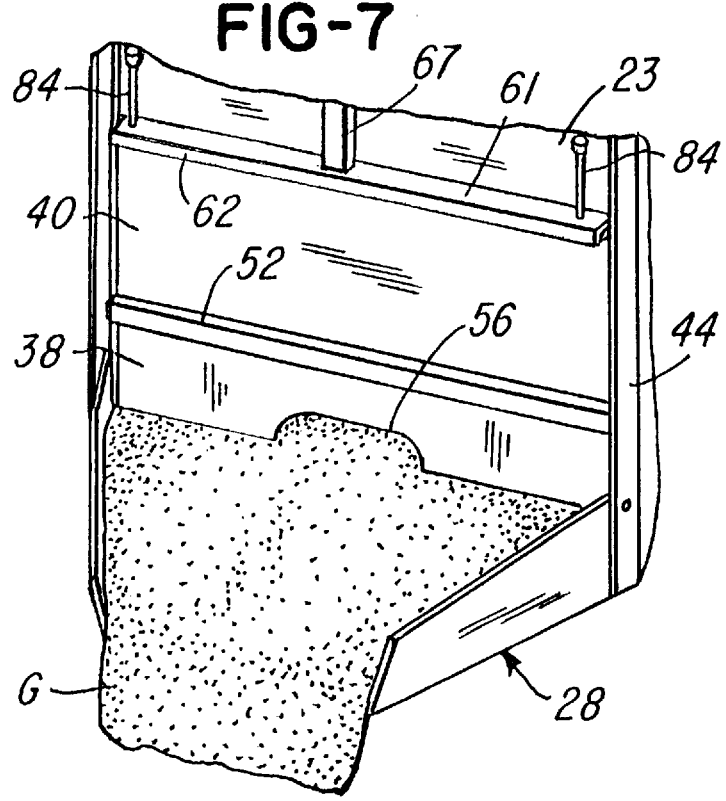
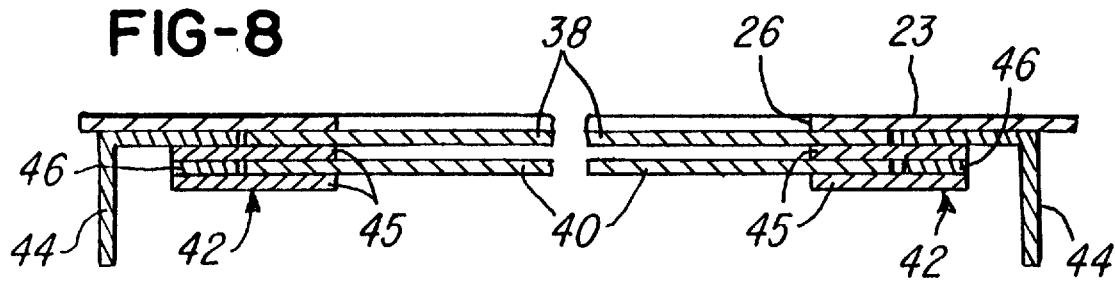
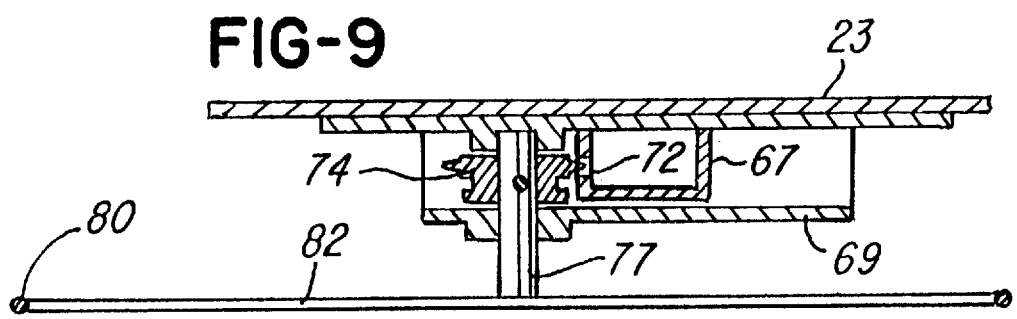

GRAVITY DISCHARGE GRAIN WAGON WITH DISCHARGE OPENING CLOSURE SYSTEM

BACKGROUND OF THE INVENTION

This invention relates to a wheel supported wagon for transporting a granular material such as grain and of the general type disclosed in U.S. Pat. No. 5,615,990 issued to the assignee of the present invention. As shown in this patent, a wheel supported frame supports a gravity discharge hopper or container having sloping side walls extending to a bottom wall, and a rectangular discharge opening is formed within one of the side walls adjacent the bottom wall. A generally flat closure door or panel is supported for sliding movement by parallel spaced tracks mounted on the one side wall for movement between a lower position closing the discharge opening and a retracted open position allowing grain to flow from the chamber defined by the container. The grain may flow into an auger unit as disclosed in the above-mentioned patent or may flow onto an inclined chute from which the grain fal by gravity into a receiving conveyor. The closure door is moved from a lower position closing the discharge opening and an elevated or upper open position by a rack and pinion mechanism wherein the rack is connected to the door, and a hand wheel is connected to rotate the pinion, as described in the above-mentioned patent.

When grain is transported in the wagon, the grain settles and becomes compacted and results in producing substantial pressure against the closure door in its closed position. This requires that substantial torque, for example, up to 150 foot pounds, be applied to the pinion by the hand wheel in order to raise the door to its open position. In order to reduce the grain pressure against the door in its closed position and to reduce the torque required to open the door, it is known to mount a small metering door on the outside of the primary closure door by means of a set of closely spaced tracks secured to the closure door. The rack actuator is connected to the small metering door so that rotation of the hand wheel first opens the metering door to allow a small flow of grain from the container, thereby reducing the grain pressure on the primary closure door. Since the small opening within the primary closure door weakens the closure door, it has been found necessary to weld knobs or projections to the floor of the container and outboard of the bottom edge of the primary closure door or to weld a reinforcing bar to the bottom edge of the primary closure door across the metering opening to prevent outward bending of the primary closure door. The knobs or projections or reinforcing bar result in obstructing the free and smooth flow of grain through either the metering opening or under the primary closure door when the metering door or the closure door is in its open position.

SUMMARY OF THE INVENTION

The present invention is directed to improved wheel supported wagon for transporting a flowable granular material and wherein the wagon includes a container having a bottom wall and sloping side walls and an improved closure system for a bottom discharge opening within one of the side walls. The closure system includes a generally flat inner metering door panel and an adjacent generally flat outer closure door panel with both door panels supported for sliding movement by a pair of parallel spaced dual tracks mounted on the sloping side wall on opposite sides of the discharge opening. The inner door panel has a bottom edge that seats on the bottom wall of the container, and the bottom edge has a recess defining a metering passage. The inner door panel is exposed to the pressure of the grain within the container, and the outer closure panel is effective to close the metering passage. When it is desired to discharge grain, the outer closure panel is first elevated by a manually operated activator to open the metering passage. After the flow through the metering passage reduces the grain pressure on the inner door panel, the inner door panel is elevated along with the outer closure panel so that grain may flow smoothly from the container along the bottom wall without any obstructions.

Other features and advantages of the invention will be apparent from the following description, the accompanying drawings and the appended claims.

BRIEF DESCRIPTION OF THE DRAWINGS

FIG. 1 is a perspective view of a grain wagon having a bottom gravity discharge opening with a closure system constructed in accordance with the present invention;

FIG. 2 is a fragmentary perspective view of the closure system in its closed position;

FIG. 3 is a view similar to FIG. 2 and illustrating the closure system with the metering passage open;

FIG. 4 is a fragmentary view similar to FIG. 3 and illustrating grain flowing through only the metering passage;

FIG. 5 is an enlarged fragmentary section taken generally on the line 5—5 of FIG. 3;

FIG. 6 is a fragmentary perspective view similar to FIG. 3 and showing the closure system in an open position;

FIG. 7 is a fragmentary view similar to FIG. 6 and illustrating the flow of grain through the discharge opening with the closure system shown in the open position of FIG. 6;

FIG. 8 is a fragmentary section taken generally on the line 8—8 of FIG. 3; and

FIG. 9 is a fragmentary section taken generally on the line 9—9 of FIG. 3.

DESCRIPTION OF THE PREFERRED EMBODIMENT

FIG. 1 illustrates a cart or wagon 10, commonly used for transporting grain, and which includes a frame 12 supported by a pair of rear wheels 14 and a pair of front wheels 16. The front wheels 16 are steerable by a tow bar 17 which is usually hitched to a tow vehicle such as a tractor used for pulling the wagon 10. The frame 12 supports a gravity discharge hopper or container 20 having inclined side walls 22 and 23 extending upwardly from a floor or bottom wall 24 (FIGS. 5 & 6). The open top container 20 defines a chamber which is adapted to receive a granular material such as grain or fertilizer, and the material is discharged through a rectangular bottom discharge opening 26 (FIG. 5) formed within the left side wall 23 and extending upwardly from the bottom wall 24.

As illustrated in FIGS. 1–6, a tapered discharge chute 28 is pivotally supported adjacent the bottom of the discharge opening 26 and pivots between an inactive or stored position (FIG. 1) extending generally parallel to the side wall 23 and a downwardly inclined discharge position where the bottom wall of the inclined chute 28 forms a continuation of the bottom wall 24 of the hopper or container 20, as shown in (FIG. 5).

In accordance with the present invention, the flow of granular material through the discharge opening 26 is controlled by a closure system 35 (FIG. 5) which includes an inner metering door panel 38 and an outer closure door panel 40 each of which is formed of sheet metal and have substantially the same width. Preferably, the inner metering door panel 38 is formed of six gauge steel, and the outer closure door panel is formed of a thinner sheet steel such as eleven gauge steel. The door panels 38 and 40 are slidably supported by a pair of parallel spaced dual guide tracks 42 (FIG. 8) which incorporate reinforcement angles 44 welded to the side wall 23. A set of guide strips 45 and spacer strips 46 are also secured to the side wall 23 by a series of welds or bolts (not shown) which extend through aligned holes within the angles 44 and strips 45 & 46 and the side wall 23. The guide tracks 42 support the inner door panel 38 and outer door panel 40 for vertical sliding movement between lower closed positions (FIG. 2) and opened upper positions (FIG. 6).

Referring, to FIG. 5, the outer door panel 40 is reinforced along its bottom edge portion by a channel 52 welded to the panel 40, and an upper edge portion of the panel 40 is bent 90° to form an outwardly projecting top flange 54. The lower edge portion of the metering door panel 38 is formed with an elongated recess 56 (FIG. 6) which defines a metering passage 58. An upper edge portion of the metering door panel 38 is bent at right angles to form an outwardly projecting top flange 61 (FIG. 5) having a downwardly projecting lip 62.

The vertical movement of the door panels 38 and 40 is controlled by a conventional door opening and closing actuator 65 as generally described in above-mentioned Patent No. 5,615,990. The actuator includes an elongated vertical channel 67 (FIG. 9) which extends through vertically aligned holes within a laterally extending support bracket 69 secured to the side wall 23. The channel also extends through the top flange 61 of the metering door panel 38, and the lower end portion of the channel 67 is welded to a plate secured to the top flange 54 of the outer closure door panel 40. As shown in FIG. 9, the channel 67 is provided with vertically spaced holes 72 to form a rack-type gear which is engaged by outwardly projecting teeth of a pinion 74 mounted on a cross shaft 77 supported for rotation by the bracket 69. A hand wheel 80 has a cross rod 82 welded to the outer end of the shaft 77 so that rotation of the hand wheel 80 is effective to move the rack or channel 67 in a generally vertical direction parallel to the side wall 23. As shown in FIGS. 3, 4 & 6, a pair of guide pins with heads or bolts 84 are secured or welded to opposite end portions of the top flange 54 of the outer door panel 40 and project upwardly through aligned clearance holes within the top flange 61 of the inner door panel 38 so that the panels 38 and 40 are maintained substantially in parallel relation.

In operation of the closure system 35, when the container 20 encloses a load of granular material such as grain, the settling and compacting of the grain produces substantial pressure against the inner door panel 38 and against a lower portion of the outer door panel 40 since the lower portion receives grain pressure through the metering opening 58. When it is desired to discharge the granular material or grain, the outer door panel 40 is raised several inches by rotation of the hand wheel 80 until the door panel 40 is in a metering position, as shown in FIG. 4, where grain G flows out of the container through the metering passage 58 and onto the discharge chute 28.

After sufficient grain G has been discharged from the container 20 so that the pressure of the grain G against the metering door panel 38 is substantially reduced, the outer door panel 40 is lifted higher so that it picks up the inner door panel 38 whereby both panels 38 & 40 are elevated to open positions where the grain G flows smoothly along the bottom wall 24 and into the chute 28, as illustrated in FIG. 7. The door panels 38 & 40 are also shown in open positions in FIG. 6 without the flow of grain under the door panels. After the container is empty and it is desired to close the discharge opening 26, the hand wheel 80 is rotated to lower the outer door 40. As the outer door 40 moves downwardly to its closed position, the heads on the pins 84 automatically move the inner door 38 to its closed position (FIG. 2).

From the drawings and the above description, it is apparent that a grain wagon incorporating a discharge opening closure system constructed in accordance with the present invention, provides desirable features and advantages. As one feature, a substantially lower torque is required on the hand wheel 80 in order to raise the outer door panel 40 to the open position shown in FIG. 4 where a small flow of grain is metered from the container until the grain pressure on the inner door panel 38 is substantially reduced. The inner metering door panel 38 may then be elevated to a selected open position with also substantially lower torque on the hand wheel 80. The closure system also provides for a smooth unobstructed flow of the grain through the metering passage 58 and also along the floor or bottom wall 24 when both the inner and outer door panels are elevated to open positions. Also, in the event the pressure of the compacted grain is sufficiently high to bow the inner door panel 38 slightly outwardly, the outer door panel 40 provides a back-up support to reinforce the inner door panel 38. The closure system further provides for simplified and economical construction and assembly of the closure system.

While the form of grain wagon and discharge opening closure system herein described constitutes a preferred embodiment of the invention, it is to be understood that the invention is not limited to his precise form of closure system, and that changes may be made herein without departing from the scope and spirit of the invention as defined in the appended claims.

What is claimed is:

1. A wheel supported wagon for transporting a flowable granular material, comprising a container defining a chamber adapted to receive a volume of the material, said container having a bottom wall and sloping side walls with a bottom discharge opening within one of said side walls, a set of parallel spaced guide tracks mounted on said one side wall on opposite sides of said discharge opening, a generally flat outer door panel supported by said tracks for movement adjacent said one side wall between an upper open position and a lower closed position covering said discharge opening, a generally flat inner door panel supported by said tracks for movement adjacent said outer door panel and positioned inwardly toward said chamber from said outer door panel for resisting the pressure of the material within said chamber, said inner door panel having a bottom edge portion with a recess defining a material flow metering passage extending upwardly from said bottom wall, and an actuator for first raising said outer door panel to permit material to flow only through said metering passage and under said outer door panel for releasing pressure of the material against said inner door panel and thereafter raising said inner door panel to permit a substantially larger flow of material through said discharge opening under both of said door panels.

2. A wagon as defined in claim 1 a wherein said door panels are connected to elevate said inner door panel to an open position in response to elevating said outer door panel above said metering passage.

3. A wagon as defined in claim 1 wherein each of said door panels includes a top flange projecting outwardly from said one side wall, and said actuator includes a lift member extending through an opening within said top flange of said inner door panel and connected to said top flange of said outer door panel.

4. A wagon as defined in claim 3 and including a set of pins extending upwardly from said top flange of said outer door panel through aligned holes within said top flange of said inner door panel, and said pins have head portions effective to move said inner door panel to a closed position in response to movement of said outer door panel to said closed position.

5. A wagon as defined in claim 1 wherein said outer door panel and said inner door panel are generally the same size, and a reinforcing member secured to a lower edge portion of said outer door panel and extending across said metering opening.

6. A wheel supported wagon for transporting a flowable granular material, comprising a container defining a chamber adapted to receive a volume of the material, said container having a bottom wall and sloping side walls with a bottom discharge opening within one of said side walls, a generally flat outer door panel supported for movement adjacent said one side wall between an upper open position and a lower closed position covering said discharge opening, a generally flat inner door panel positioned adjacent said outer door panel inwardly toward said chamber for resisting the pressure of the material within said chamber, said outer door panel and said inner door panel have generally the same width, a pair of parallel spaced track members mounted on said one side wall and supporting each of said door panels for sliding movement, said inner door panel having a bottom edge portion with a recess defining a material flow metering passage extending upwardly from said bottom wall, and an actuator for first raising said outer door panel to permit material to flow only through said metering passage for releasing pressure of the material against said inner door panel and thereafter raising said inner door panel to permit a substantially larger flow of material through said discharge opening under said door panels.

7. A wagon as defined in claim 6 wherein said door panels are connected to elevate said inner door panel to an open position in response to elevating said outer door panel above said metering passage.

8. A wagon as defined in claim 6 wherein each of said door panels includes a top flange projecting outwardly from said one side wall, and said actuator includes a lift member extending through an opening within said top flange of said inner door panel and connected to said top flange of said outer door panel.

9. A wagon as defined in claim 4 and including a reinforcing member secured to an outer surface of a lower edge portion of said outer door panel and extending across said metering opening.

\* \* \* \* \*